United States Patent [19]

Takahashi

[11] Patent Number: 4,587,615
[45] Date of Patent: May 6, 1986

[54] SYSTEM FOR DIAGNOSING AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 535,511

[22] Filed: Sep. 26, 1983

[30] Foreign Application Priority Data

Oct. 1, 1982 [JP] Japan .................. 57-173628

[51] Int. Cl.⁴ .............. F02D 5/00; G06F 11/30
[52] U.S. Cl. ............... 364/431.11; 364/431.01; 123/479
[58] Field of Search ......... 364/431.01, 431.11; 123/479, 491, 494; 340/52 F, 52 R, 57; 73/119 A

[56]  References Cited
U.S. PATENT DOCUMENTS

| 3,938,075 | 2/1976 | Reddy . | |
|---|---|---|---|
| 4,219,798 | 8/1980 | Frister . | |
| 4,244,340 | 1/1981 | Heath et al. . | |
| 4,246,566 | 1/1981 | Endo et al. . | |
| 4,287,503 | 9/1981 | Sumida | 340/52 F |
| 4,370,962 | 2/1983 | Hosaka | 123/479 |
| 4,378,771 | 4/1983 | Sawada et al. | 123/479 |
| 4,386,427 | 5/1983 | Hosaka | 364/431.11 |
| 4,414,949 | 11/1983 | Honig et al. | 364/431.11 |
| 4,450,815 | 5/1984 | Mouri | 123/479 |

FOREIGN PATENT DOCUMENTS

| 0141926 | 11/1979 | Japan | 123/479 |
|---|---|---|---|
| 0005433 | 1/1980 | Japan | 123/479 |

Primary Examiner—Parshotam S. Lall
Attorney, Agent, or Firm—Martin A. Farber

[57] ABSTRACT

A system for diagnosing an internal combustion engine having engine operation sensing devices. A diagnosing circuit is provided to response to output voltages of the sensing devices for producing a first signal when the voltage exceeds a predetermined range and a second signal with a delay after the first signal. A fail-safe signal generating circuit is provided to produce one of fail-safe signals in dependency on the first signal so as to prevent the stall of the engine.

The second signal operated to indicate trouble in the engine operation sensing devices after the fail-safe operation.

2 Claims, 2 Drawing Figures

SYSTEM FOR DIAGNOSING AN INTERNAL COMBUSTION ENGINE

BACKGROUND OF THE INVENTION

The present invention relates to a diagnosis system for internal combustion engine mounted on a motor vehicle.

An electronic fuel-injection system of the type which is provided with a computer operable to compute various input signals from sensing devices, such as a throttle position sensor, intake airflow meter, intake manifold vacuum sensor and coolant temperature sensor in order to produce output signals for driving solenoid-operated fuel injectors is known. For example, the coolant temperature sensor is provided to produce an output signal, when the temperature elevates to a predetermind value. The computor uses the output signal as an input signal representing engine warming-up. However, if fault, such as disconnection of wires for the sensor or short circuit of the sensor occurs in the coolant temperature sensor system, the sensor produces an output having extreme value, which results in failure of the controlling of air-fuel ratio of injected fuel and in stalling of the engine.

In order to avoid such difficulties, a fail-safe system is proposed. The fail-safe system is so arranged as to produce a fail-safe signal, when fault in a sensing device continues for a predetermined time and to produce a quasi signal which causes fuel injectors to supply a proper amount of fuel to the engine to maintain the operation of the engine. At the same time, the fail-safe signal causes a driver circuit to light a warning lamp indicating the fault. However, it is undesirable to a driver of the vehicle to warn such a fault which recovers after a very short time. On the contrary, fail-safe operation should be started as soon as possible, in order to prevent stalling of the engine.

SUMMARY OF THE INVENTION

It is an object of the present invention to provide a diagnosis system which produces a fail-safe signal to keep engine operation immediately after fault occurs in a sensing system and to produce a warning signal after the fault continues for a predetermined period.

The present invention will be more apparent from the following description made with reference to the accompanying drawings.

DETAILED DESCRIPTION OF THE PREFERRED EMBODIMENT

Figure 1:
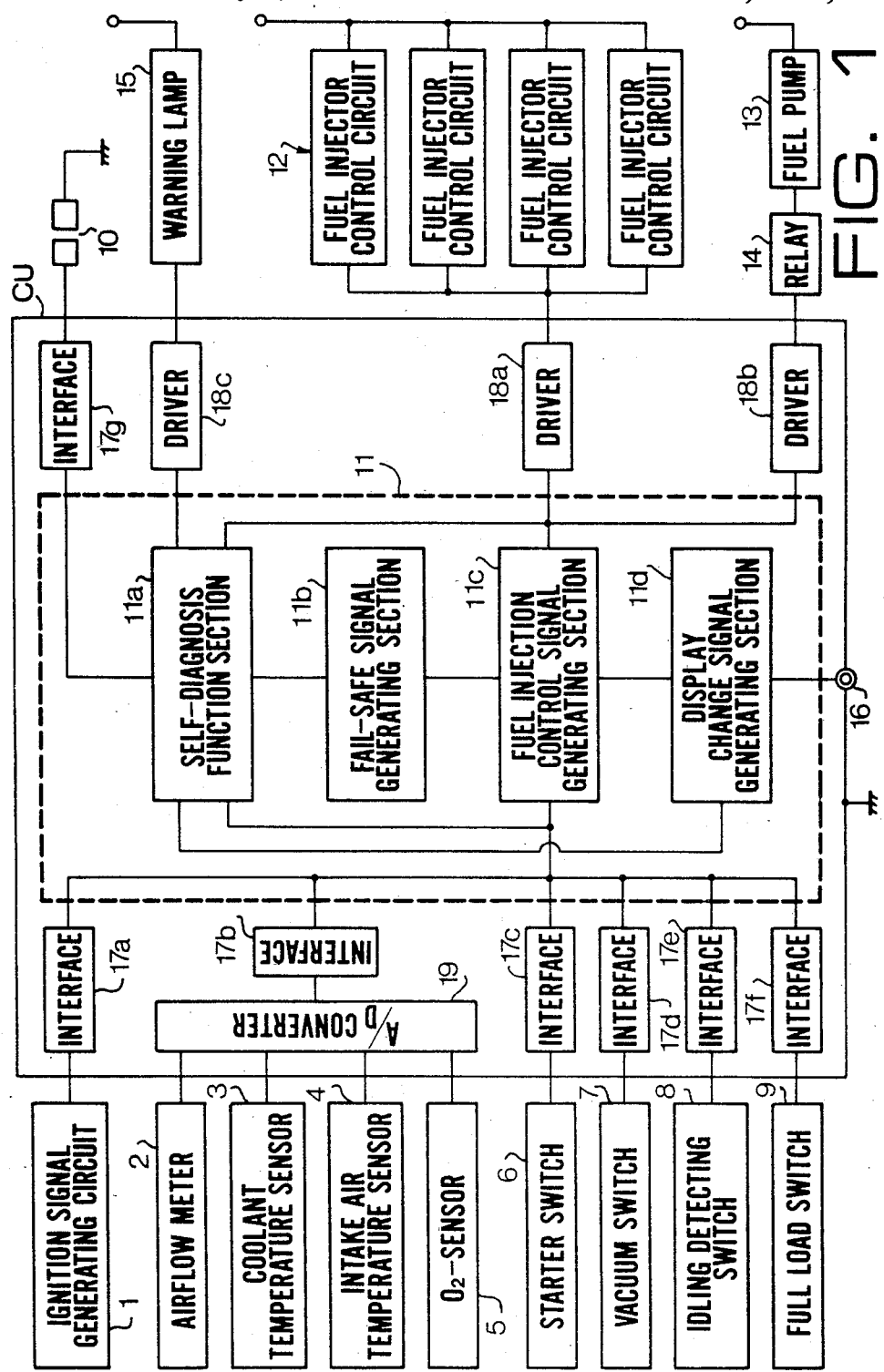
FIG. 1 is a block diagram showing a diagnosis system for operation of an engine.

FIG. 1 diagrammatically shows a diagnosis system for operation of an engine including a system of the present invention. The system comprises an engine operation sensing means 1 to 9, and a control unit CU. The control unit CU comprises a computor 11 including memories, I/O and timers, interfaces 17a to 17g, drivers 18a to 18c. The sensing means comprises an ignition signal generating circuit 1, output signal of which represents an ignited cylinder of the engine and ignition timing thereof, an airflow meter 2, a coolant temperature sensor 3, an intake air temperature sensor 4, and an $O_2$-sensor 5 for detecting oxygen concentration in exhaust gases. The detecting means group further comprises a starter switch 6 for detecting operation of the starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking of fault. When the terminal 10 is connected to the ground at a shop, fault condition memorized in the display change signal generating section 11d is displayed by the lamp 16. During the drive of the motor vehicle, a terminal 10 is disconnected to the ground. The output of the ignition signal generating circuit 1 is applied to self-diagnosis section 11a and fuel injection control signal generating section 11c through the interface 17a. Outputs of airflow meter 2 and sensors 3 to 5 are applied to section 11a and 11c through an A/D converter 19 and the interface 17b.

Further, outputs of switches 6 to 9 are applied to sections 11a and 11c through interfaces 17c to 17f, respectively.

The self-diagnosis function section 11a monitors inputs from the engine operation sensing means 1 to 9 and when any fault is detected, a signal is sent to a warning lamp 15 through the driver 18c after a predetermined period to warn the fault. Further, when such a serious engine trouble that will stall the engine occurs, the self-diagnosis function section 11a sends a diagnosis signal dependent on the kind of the engine trouble to the fail-safe signal generating section 11b. The fail-safe signal generating section 11b stores a plurality of data to avoid the engine stall caused by the engine trouble and produces a fail-safe signal dependent on the diagnosis signal. The fail-safe signal is fed to the fuel injection control signal generating section 11c which operates to stop the input from the sensing means 1 to 9.

In normal engine operation, the fuel injection control signal generating section 11c operates to produce an air-fuel ratio control signal by computing inputs applied form the engine operation sensing means 1 to 9.

The air-fuel ratio control signal is fed to a fuel pump 13 through the driver 18b and a relay 14 and to fuel injector control circuits 12 through the driver 18a so as to inject fuel of a proper amount at a proper time. Further, the fuel injection control signal generating section 11c sends a signal to a switching section 11d in response to an input from the $O_2$-sensor 5. The switching section 11d sends a signal to a monitor lamp 16 in response to the signal from the fuel injection control signal generating section 11c to indicate a fact that normal oxygen concentration is included in exhaust gases.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittently lights in accordance with a pattern which is decided by the diagnosis signal by connecting the terminal 10 to the ground at a shop. An inspector in the shop can know the kind of the engine trouble by the pattern of the lighting of the lamp 16.

In accordance with the present invention, when fault occurs in any of engine operation sensing means 1 to 9, the self-diagnosis function section 11a generates a signal and the signal is fed to the fail-safe signal generating section 11b.

Figure 2:
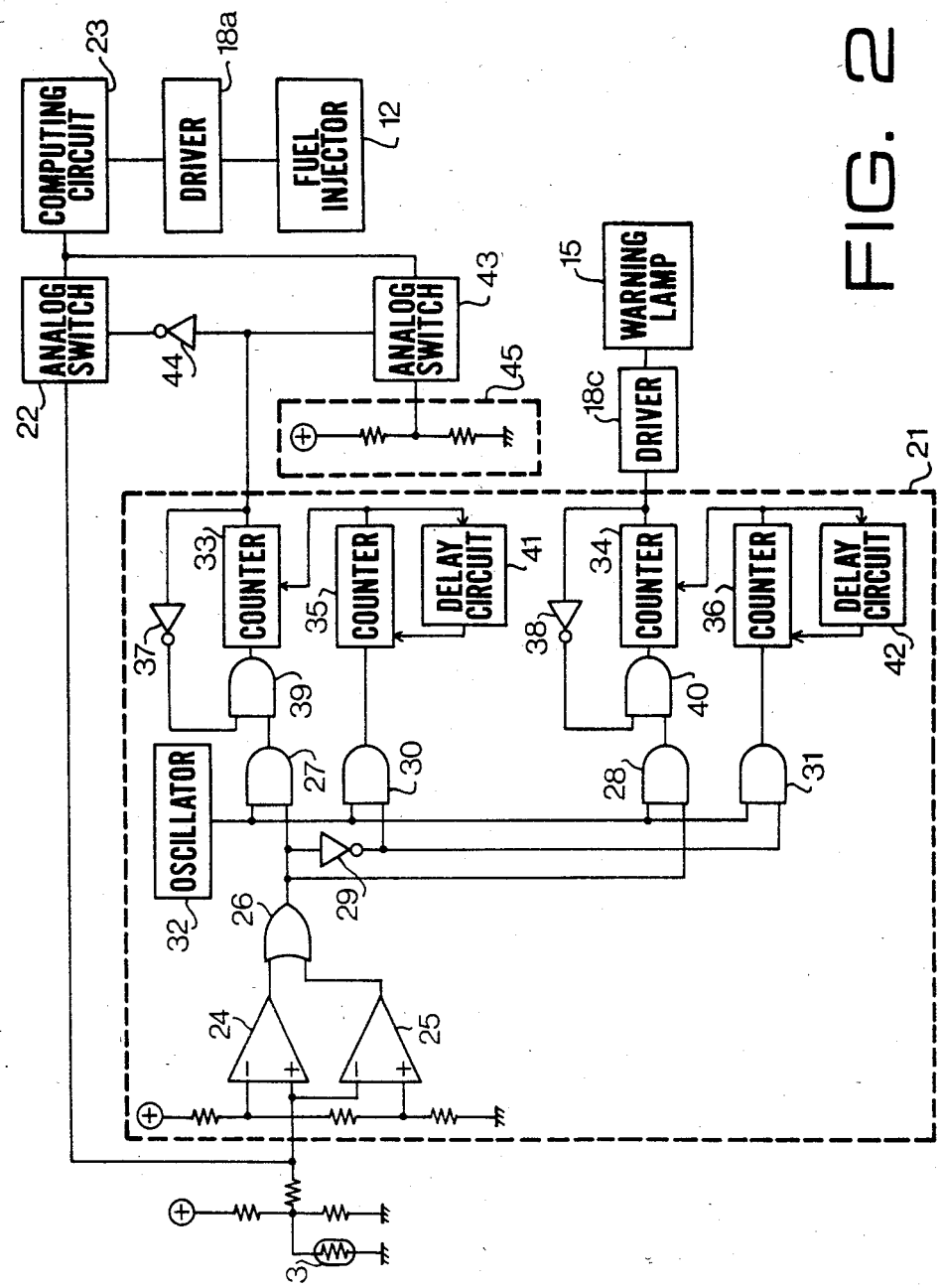
FIG. 2 is a coolant temperature sensor diagnosing circuit according to the present invention.

FIG. 2 shows a diagnosing circuit 21 for coolant temperature, which is included in the self-diagnosis function section 11a (FIG. 1), and a fail-safe signal generating circuit 45 which is included in the fail-safe signal generating section 11b. The output of the coolant temperature sensor 3 is fed to a window comparator comprising comparators 24 and 25 and an OR gate 26, in the coolant temperature diagnosing circuit 21, and further fed to a computing circuit 23 through an analog switch 22.

Output of the window comparator is applied to AND gates 27 and 28 and also applied to AND gates 30 and 31 through an inverter 29 respectively. These AND gates are applied with pulses from an oscillator 32 to produce pulses dependent on the outputs of the window comparator.

The coolant temperature diagnosing circuits 21 is provided with a first counter 33 for detecting the coolant temperature and a second counter 35 for resetting the first counter 33. The circuit 21 is further provided with a third counter 34 for lighting the warning lamp 15 and with a fourth counter 36 for resetting the third counter 34.

If the output voltage of the coolant temperature sensor exceeds a predetermined range of the window comparator, the output of the OR gate 26 becomes high, so that AND gates 27 and 28 produces pulses. The pulses are applied to counters 33 and 34 through AND gates 39 and 40. When the count of the counter 33 exceeds a set count at fault of the sensor, the counter 33 produces a high level output. Set count of the third counter 34 is more than the first counter 33, which is a sufficient time for confirming the fault. The output of the first counter is applied to the other input of the AND gate 39 through an inverter 37, so that the AND gate 39 is closed to hold the output of the counter 33. The output of the counter 33 is applied a control gate of an analog switch 43 to make it on and also applied to the control gate of the analog switch 22 through an inverter 44 to break the switch.

It is necessary to reset counters 33 and 34, if the trouble in the coolant temperature sensor recovers after a short time. Counters 35 and 36 are to reset counters 33 and 34. The output of the OR gate 26 is at a low level in normal operating conditions, so that AND gates 30 and 31 are opened to produce pulses. When the number of pulses applied to counters 35 and 36 reaches to a predetermined value which corresponds to the above described short time, counters 35 and 36 produce outputs, respectively.

The outputs are applied to reset terminals of counters 33 and 34 to reset them and also applied to their reset terminals through delay circuits 41 and 42, respectively. Thus, the reset operation of the counters 33 and 34 is repeated as long as the coolant temperature sensor 3 is in normal condition.

In normal operation, the output of counter 33 is at a low level, so that analog switch 22 is closed.

Accordingly, the output of the coolant temperature sensor 3 is applied to the driver 18a through computing circuit 23. Thus, the fuel injection control circuit 12 operates to supply fuel to the engine in dependency on the output of the computing circuit 23.

When fault occurs in the coolant temperature sensor and analog switch 22 is opened and switch 43 is closed by the output of the counter 33, a fail-safe signal from the fail-safe signal generating circuit 45 is fed to the computing circuit 23 through the switch 43. The computing circuit 23 produces a quasi air-fuel ratio control signal in response to the fail-safe signal. The quasi air-fuel ratio control signal is fed to the fuel injection control circuit 12 through the driver 18a to inject the fuel at a proper amount so as to keep the engine operation. Further, when the fault continues for a predetermined time and count of the counter 34 reaches to a set count, the output of the counter becomes high. The high level output of the counter 34 is applied to the warning lamp 15 through the driver 18c, warning the fault.

Although the fail-safe signal generating circuit 45 produces one fail-safe signal, a fail-safe signal generating circuit to produce two or more kinds of fail-safe signals can be provided.

While the presently referred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for diagnosing an internal combustion engine comprising:

an engine operation sensing device;

a diagnosing circuit including a window comparator for producing a first output signal when the output of said sensing device exceeds one of predetermined limit values, and first and second circuit means operatively coupled to said window comparator, said first circuit means producing a second output signal when the first output signal of said comparator continues for a first predetermined time, said second circuit means producing a third output signal when the first output signal continues for a second predetermined time longer than the first predetermined time;

a fail-safe signal generating circuit producing a fail-safe signal;

switch means responsive to said second output signal of said first circuit means for allowing the fail-safe signal to pass from said fail-safe signal generating circuit;

means responsive to said fail-safe signal for producing a quasi signal to maintain the operation of the engine; and an indicator means responsive to said third output signal for indicating trouble in said engine operation sensing device.

2. The system for diagnosing an internal combustion engine according to claim 1, wherein said comparator is an analog comparator, and said diagnosing circuit comprises means for changing an output signal of said comparator to a train of pulses; said first and said second circuit means comprising counters for counting said pulses of said comparator, each of said counters being adapted to produce an output signal when the counter counts up to a predetermined number.

* * * * *